(12) United States Patent
Bourcier et al.

(10) Patent No.: US 7,859,827 B2
(45) Date of Patent: Dec. 28, 2010

(54) CELLULAR HONEYCOMB ULTRACAPACITORS AND HYBRID CAPACITORS AND METHODS FOR PRODUCING

(75) Inventors: Roy Joseph Bourcier, Corning, NY (US); Kishor Purushottam Gadkaree, Big Flats, NY (US); Mallanagouda Dyamanagouda Patil, Corning, NY (US); Huan-Hung Sheng, Horseheads, NY (US); Mark J Soulliere, Corning, NY (US)

(73) Assignee: Corning Incorporated, Corning, NY (US)

( * ) Notice: Subject to any disclaimer, the term of this patent is extended or adjusted under 35 U.S.C. 154(b) by 498 days.

(21) Appl. No.: 12/084,196

(22) PCT Filed: May 26, 2006

(86) PCT No.: PCT/US2006/020564

§ 371 (c)(1),
(2), (4) Date: Apr. 25, 2008

(87) PCT Pub. No.: WO2006/130511

PCT Pub. Date: Dec. 7, 2006

(65) Prior Publication Data

US 2009/0021890 A1      Jan. 22, 2009

Related U.S. Application Data

(60) Provisional application No. 60/686,189, filed on May 31, 2005.

(51) Int. Cl.
*H01G 9/00* (2006.01)

(52) U.S. Cl. .................................. 361/502; 29/25.03

(58) Field of Classification Search ................ 361/502; 29/25.03
See application file for complete search history.

(56) References Cited

U.S. PATENT DOCUMENTS

| | | | |
|---|---|---|---|
| 5,121,301 A * | 6/1992 | Kurabayashi et al. | 361/502 |
| 5,786,981 A * | 7/1998 | Aoki et al. | 361/502 |
| 6,201,685 B1 | 3/2001 | Jerabek et al. | 361/502 |

(Continued)

FOREIGN PATENT DOCUMENTS

JP      2002033243 A  *  1/2002

(Continued)

OTHER PUBLICATIONS

Andrew Burke, "Ultracapacitor Technology: Present and future performance and applications," Advanced Capacitor World Summit, Jul. 14-16, 2004, speaker 12.

(Continued)

*Primary Examiner*—Eric Thomas
(74) *Attorney, Agent, or Firm*—Michael W. Russell (57) ABSTRACT

An ultracapacitor or hybrid capacitor includes an electrically non-conductive rigid or semi-rigid porous honeycomb structure (12) having cells extending along a common direction and having an average density per unit area within in a plane perpendicular to the common direction exceeding 15.5 per square centimeter, desirably formed of a material that is stable at temperatures of 300° or more, such that high temperatures processing can be used to help ensure high purity of the final product. The material may desirably be an oxide or non-oxide ceramic, such as cordierite, silicon nitride, alumina, aluminum titanate, zircon, glass, or glass-ceramic.

24 Claims, 7 Drawing Sheets

U.S. PATENT DOCUMENTS

| | | | |
|---|---|---|---|
| 6,212,062 B1 | 4/2001 | Day et al. | 361/502 |
| 6,225,733 B1 | 5/2001 | Gadkaree et al. | 313/352 |
| 6,304,426 B1 | 10/2001 | Wei et al. | 361/502 |
| 6,487,066 B1 | 11/2002 | Niiori et al. | 361/502 |
| 6,565,701 B1 | 5/2003 | Jerabek et al. | 156/305 |
| 6,714,391 B2 | 3/2004 | Wilk et al. | 361/15 |
| 6,738,252 B2 | 5/2004 | Okamura et al. | 361/502 |
| 2004/0085710 A1 | 5/2004 | Takeuchi et al. | 361/502 |

FOREIGN PATENT DOCUMENTS

WO        WO03049224 A1        6/2003

OTHER PUBLICATIONS

Jim P. Zheng "the Limitations of energy density of battery/double layer capacitor asymmetric cells" Journal of the Electrochemical Society, 150 (4) A484-A492 (2003).

\* cited by examiner

CELLULAR HONEYCOMB ULTRACAPACITORS AND HYBRID CAPACITORS AND METHODS FOR PRODUCING

This application claims the benefit of priority under 35 U.S.C. §119(e) of U.S. Provisional Application Ser. No. 60/686,189 filed on May 31, 2005

BACKGROUND OF THE INVENTION

1. Field of the Invention

The present invention relates generally to ultracapacitors and hybrid capacitors, and particularly to high energy density and high power density ultracapacitors and hybrid capacitors employing cellular honeycombed separator structures, and to methods for producing the same.

2. Technical Background

Ultracapacitors, also commonly referred to as electric double layer capacitors, are potentially useful for many applications where pulse power or power leveling is desirable or required. These applications range from small devices such as cell phones to large devices such as hybrid vehicles. The energy and power density of ultracapacitors known today is not as high as would be generally desired for various applications, including hybrid vehicles. A durable, easily manufactured, high energy density and/or high power density device is thus desirable.

SUMMARY OF THE INVENTION

According to one aspect of the present invention, an ultracapacitor or hybrid capacitor device includes an electrically non-conductive rigid or semi-rigid porous honeycomb structure having cells extending along a common direction, the cells having an average density per unit area within in a plane perpendicular to the common direction exceeding 15.5 per square centimeter. The average density may desirably be even higher: as high as 31, 62, or even 124 or more cells per square centimeter on average.

The porous honeycomb structure of the present invention is desirably formed of a material that is stable at temperatures of 300° C. or more, such that high temperature processing can be used to help ensure high purity of the final product. The material is desirably an oxide or non-oxide ceramic, such as cordierite, silicon nitride, aluminum Titanate, alumina, zircon, glass, or glass-ceramic.

According to the present invention, electrodes are contained within and extend along the cells, at least some of which electrodes are high-surface-area non-galvanic electrodes. An electrolyte is in contact with the electrodes via the pores of the porous honeycomb structure. All of the electrodes may be of the high-surface-area non-galvanic type, or some of the electrodes may be galvanic electrodes, such that the resulting device is a hybrid capacitor.

In one variation of the present invention, porous conductive layers serving as current collectors may be supported on the inner surfaces of the cells of the honeycomb structure, and may be as thin as 20 microns or even 5 microns. In an alternate version of this variation of the present invention, the conductive layers may be supported on only a portion of the inner surfaces such as at corners of the inner surfaces of the cells. As a further variation of the present invention, conductive wires or pins may be inserted into the cells of the honeycomb structure to serve as current collectors.

In another variation of the present invention, cells of the honeycomb structure may be of non-uniform size, and the sizes or size differences of the cells may be optimized for use with specific hybrid capacitor chemistry.

In another aspect of the present invention, methods are provided for making the inventive devices described herein.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Reference will now be made in detail to the present preferred embodiment(s) of the invention, examples of which are illustrated in the accompanying drawings. Whenever possible, the same reference numerals will be used throughout the drawings to refer to the same or like parts.

Figure 1:
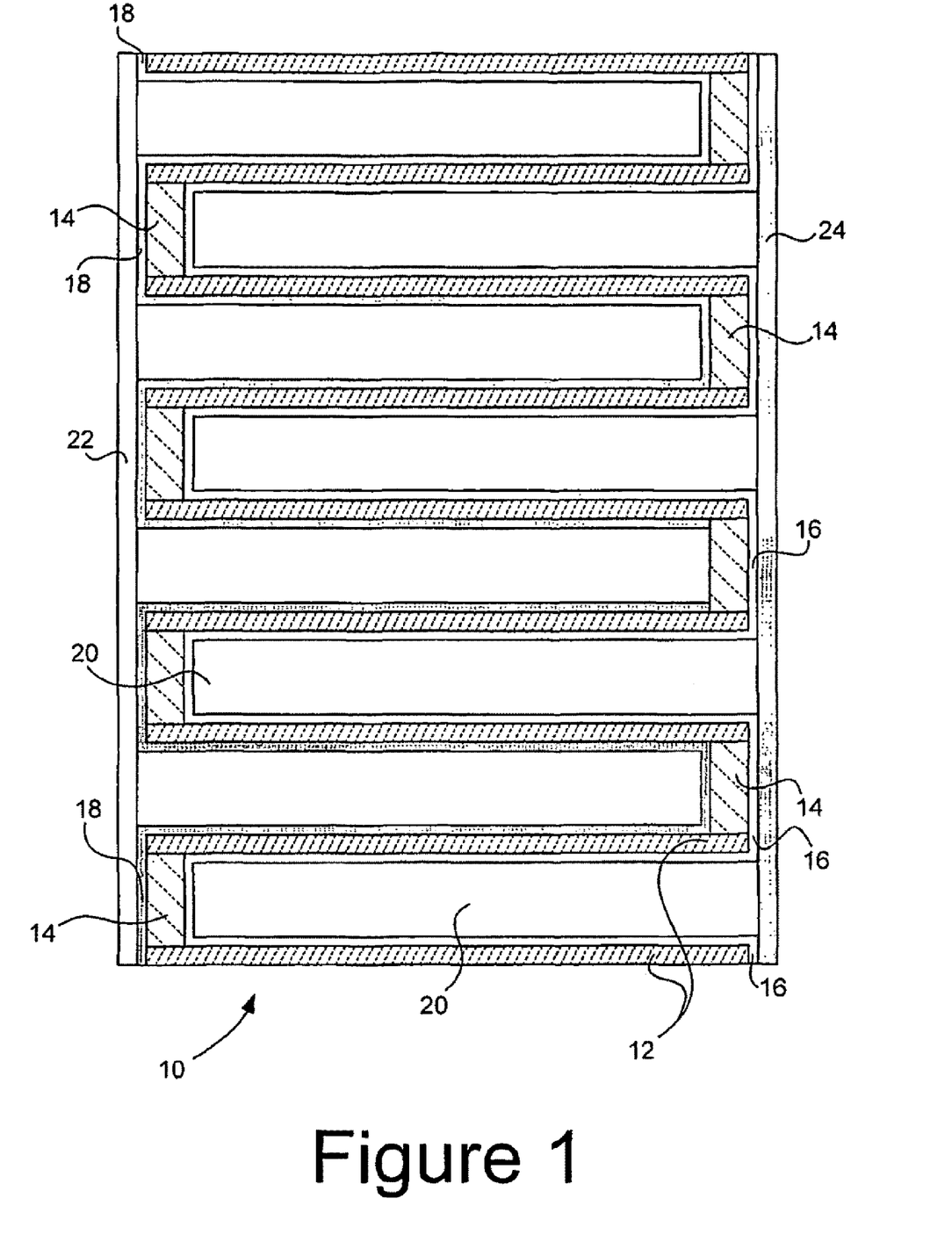
FIG. 1 is a diagrammatic cross-section of an ultracapacitor device according to the present invention.

FIG. 1 shows a cross-section of one embodiment of an ultracapacitor or hybrid capacitor device 10 according to the present invention. The ultracapacitor device 10 is formed on and in a rigid or semi-rigid ceramic or polymer honeycomb structure 12, seen in FIG. 1 in cross-sectional view only, with the cells of the honeycomb extending along in the leftward and rightward direction within the figure. The honeycomb structure 12 is porous to allow an electrolyte to permeate the walls between adjacent cells within the honeycomb structure, so as to contact opposing electrodes via the pores.

Honeycomb structures have very high surface area to volume ratio, allowing for the achievement of easy migration of charge via an electrolyte through the walls of the structure 12. In addition, the open volume fraction of the honeycomb structure 12 may be controlled by controlling the wall thickness and cell density. Use of a honeycomb separator structure provides not only separation but also structural strength and integrity in the completed device. As will be explained more fully below, these attributes can be used to create a robust, high energy and/or power density, compact ultracapacitor or hybrid capacitor device.

Although the honeycomb structure 12 may comprise thermoplastic and/or thermoset polymers such as PTFE (polytetrafluoroethylene), PVDF (polyvinyledene fluoride) Polypropylene, Polyethylene, Polycarbonate, epoxy, phenolic etc., the honeycomb structure is more desirably fabricated (1) from either ceramic material such as cordierite, alumina, aluminum titanate, mullite, zircon, glass, or glass-ceramic, or (2) from any other oxide or non-oxide ceramic—e.g., SiC, $Si_4N_4$, etc., that is electrically non-conducting. These ceramic materials can easily withstand processing temperatures of 300° C. or more. This is significant, as typical ultracapacitor and hybrid capacitor chemistries are very sensitive to any impurity in the electrolyte or electrode materials. In particular, the highest performing organic electrolyte solutions are very sensitive to water, and best performance can only be obtained in the absence of water. The option of processing the separator material at very high temperature provides an easy method of quickly achieving very low impurities and very low water content in the final product. A more traditional polymer separator lacks this advantage.

As noted above, the porous wall of the honeycomb is utilized as a separator between adjacent cells of the honeycomb structure. Adjacent cells are desirably blocked at opposite ends of the cells by plugs 14 as shown in FIG. 1.

Current collectors may desirably be provided in the form of porous conductive layers 16 and 18, which may take the form of metal layers coated or deposited or otherwise conformed to the walls of the honeycomb structure 12. Conductive layers 16 and 18 are structured so as to avoid extending substantially through the porous wall of honeycomb structure 12, such that there is no electrical contact between adjacent cells within the honeycomb structure 12, i.e., no contact between conductive layers 16 and 18, except via the electrolyte employed. Because porous conductive layers 16 and 18 are supported on honeycomb structure 12, layers 16 and 18 need not be sufficiently thick to be self-supporting, and may generally be thinner than current collector layers in existing ultracapacitor or hybrid capacitor designs. Layers 16 and 18 are desirably least as thin as 20 microns or thinner, and more desirably at least as thin as 10 microns.

The honeycomb cells defined by the walls of the honeycomb structure 12 contain a high-accessible-surface-area electrode material 20 suffused with an electrolyte solution, which solution also permeates the conductive layers 16 and 18 and the porous walls defined by the honeycomb structure 12. Electrolytes useful in the present invention include, for example, aqueous electrolytes such as $H_2SO_4$, KOH, and organic solvent based electrolytes such as tetraethylammonium tetrafluoroborate in either propylene carbonate or acetonitrile, and others known in the art.

The electrode material 20 is chosen from non-galvanic materials, i.e., materials that do not undergo faradaic reactions in the selected electrolyte solution within the intended operating voltage range of the device. Such non-galvanic electrode material may desirably be a carbon paste containing activated carbon and/or carbon nanotubes, carbon aero-gel powder, and one or more of graphite powder, carbon black, carbon nanofibers, etc., optionally with a binder such as a fluoropolymer.

As an alternative embodiment, some of the cells formed by the honeycomb structure may be filled with one or more chemically active electrode materials so as to form a hybrid capacitor. Such chemically active or "galvanic" electrode materials known in the art as useful in forming a hybrid capacitor include, for example, iron oxide, ruthenium oxide, lead oxide, manganese oxide, and lithium titanate. Both conductive filler and binder are optional. Binder, if present, may be a fluoropolymer or other suitable material.

The opposite ends of the device 10 are desirably connected to a metal foils 22 and 24 or other convenient current collectors to form the electrical terminals of the device 10. While it will be readily recognized that other electrical interconnection patterns are possible, it is deemed desirable that every cell border only cells of opposite polarity, and that one pole is located at one end of the device at foil 22, for example, and the other pole is opposite at foil 24.

Figure 2:
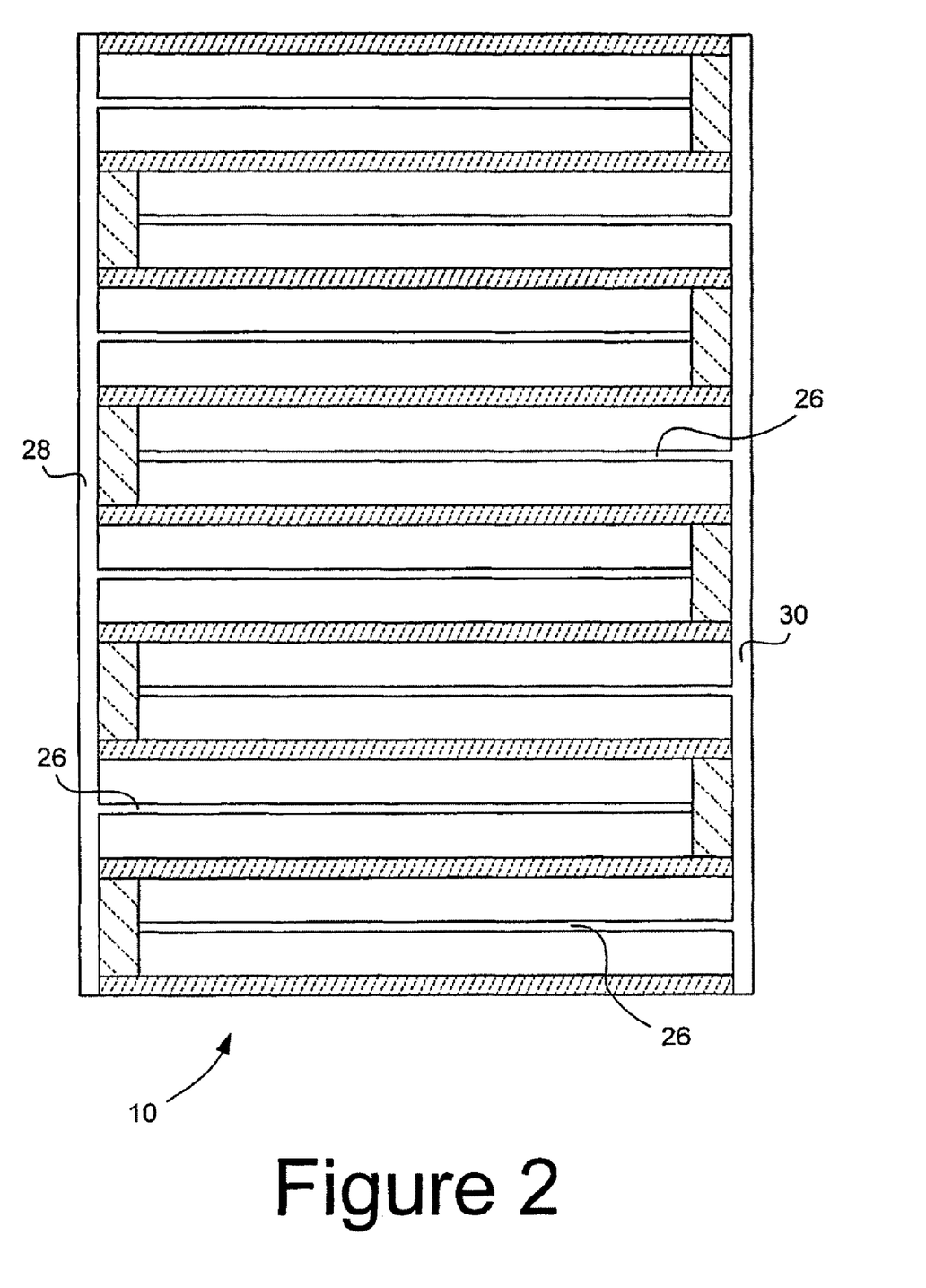
FIG. 2 is a diagrammatic cross-section of another embodiment of an ultracapacitor device according to the present invention.
Figure 3:
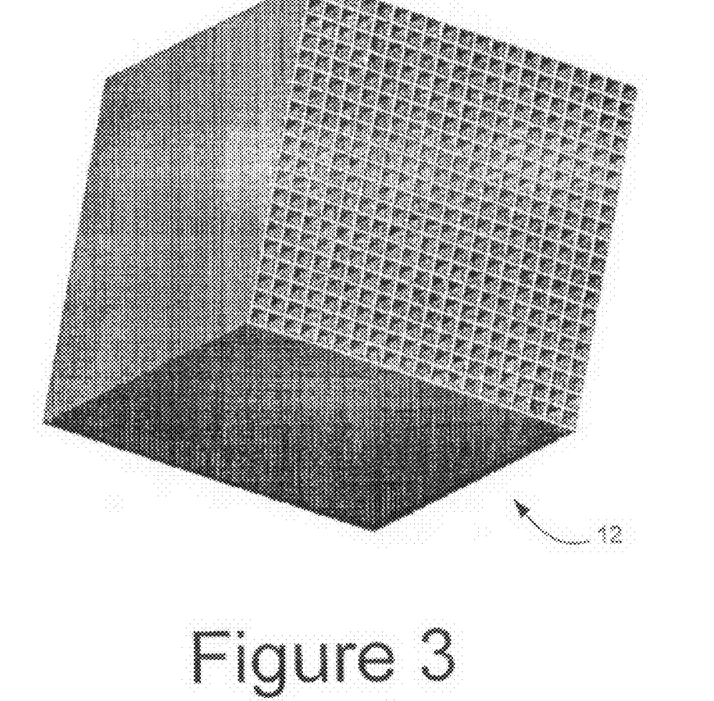
FIG. 3 is a perspective view of one embodiment of a honeycomb separator structure useful in some of the devices and methods of the present invention.
Figure 4:
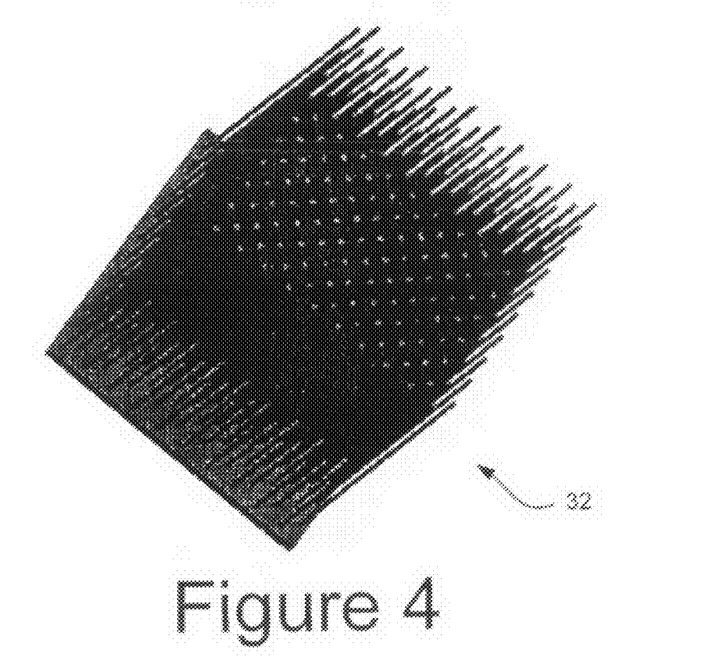
FIG. 4 is a perspective view of one embodiment of a pin array structure useful in some of the devices and methods of the present invention.

FIG. 2 shows a cross section of an alternative embodiment of an ultracapacitor device 10 according to the present invention. In the embodiment of FIG. 2, metal wires or posts or pins 26 may be inserted into each of the honeycomb cells to act as current collectors, and metal layers 16 and 18 may thus be omitted. Posts or pins 26 are each in electrical contact with one of two plates 28 and 30, and may be supported by plates 28 and 30 or formed integrally therewith. FIG. 3 shows a perspective view of a square-celled honeycomb structure 12, and FIG. 4 shows a perspective view of a pin plate 32 such as may be assembled with the honeycomb structure 12 of FIG. 4, by inserting the pins into the cells of the honeycomb structure 12. Pin spacing of the pin plate 32 is matched to the structure 12 so as to provide a pin from pin plate 32 in every other cell.

There are several advantages to the present invention compared to other presently available technologies. Present ultracapacitor designs typically contain only about 40-45% (by volume) of high-surface-area electrode material, the key material needed for high energy and power density. In contrast, a ceramic honeycomb structure with 400 cells per square inch (62 cells per square centimeter) and a 5 mil (125 micron) wall thickness, for example, has an open frontal area (OFA) of 80%. This means that nearly 80% of the total volume is available to fill with active material in such a structure. A 900 cell per square inch (139.5 cell per square centimeter) and 2 mil (50 micron) thick wall structure, provided by existing production of honeycombed ceramic material for environmental purposes, has an OFA of 88%. Since the separator is self-supporting and relatively robust, metal current collectors carried on the separator surfaces need not be very thick, thus saving the great majority of the volume for electrode material. An ultracapacitor of the present invention thus offers the opportunity of approximately doubling the total electrode volume within a given ultracapacitor volume, relative to typical current devices, thus allowing the doubling of the energy density per unit volume also.

For a honeycomb structure 12 with a high cell count per unit area, the distance from any point on the electrode material to the nearest current collector is minimized, thus allowing for lower internal resistance and higher power output in the same volume device.

To achieve increased energy density and power density, it is useful to employ honeycomb structures having a density of greater than 100 honeycomb cells per square inch (15.5 cells per square centimeter), desirably at least 200 per square inch or 31 per square centimeter. For even higher performance, it is desirable to utilize cell densities of 400 and more per square inch (62 per square centimeter) or even 800 and more per square inch (124 per square centimeter). The honeycomb structure is presently capable of being produced with cell densities of up to 1600 cells per square inch (248 per square centimeter) and wall thickness down to 1 mil (about 25 microns).

The ceramic honeycomb structure of the present invention provides a rigid durable packaging structure, while the porous walls simultaneously act as a separator. The porosity of the walls can be successfully adjusted to 50% or more. This compares to 30-40% porosity for typical separators, allowing better flow of the electrolyte through the structure.

Furthermore, essentially any type of electrode material may be used in the devices of the present invention: for example, intercalated carbon, synthetic carbon, carbon nanotubes, or combinations of these may be used, depending upon the mix of properties desired. Non-carbon electrodes may also be employed. The capacitors of the present invention are thus flexible in design to meet a wide range of needs.

Another possible advantage of capacitors structured according to the present invention is in cost. Up to 50% of the cost of the typical ultracapacitor device is in separator and packaging materials. The honeycomb structure with integral separator provides both package and separator at relatively low cost, since ceramic honeycomb technology is in large scale commercial production with very low cost manufacturing already demonstrated. The honeycomb is a useful package but is not merely a package. It provides structural integrity to the device.

The ceramic honeycomb structure is fabricated according to methods generally well known in the art. Depending on the composition desired (mullite, cordierite etc.), appropriate powdered raw materials such as clays or powdered inorganic oxides and hydroxides are mixed in proper proportion, then binders, such as methyl—cellulose binders, and plasticizers are added to the batch, with an appropriate amount of water. The batch is mixed, optionally with pore formers added, and then extruded through a die with desired cell density and wall thickness. The extruded honeycomb structure is then dried and fired at appropriate temperatures (e.g., 1500° C. for cordierite) to burn out binder (and pore formers, if any) and to sinter to a strong and porous honeycomb structure with high open frontal area. The cross section of the honeycomb cells may be circular, rectangular, triangular, hexagonal, or of other desired shape.

Next, alternate cell openings on one face of honeycomb may desirably be plugged. (It will be recognized that alternate plug and collector structures are possible.) The plugs 14 may contain inorganic powers with binders, which are then again fired to remove the binders and sinter the plugs. In an alternative method, the plugs 14 may be organic polymeric plugs of a material such as epoxy, fluoropolymer, silicones or another polymer which forms a good bond with the ceramic honeycomb and is compatible with the electrolyte. As an additional alternative, plugged honeycomb structure may be molded or extruded in one process step, as is known in the art. Whatever the process employed, the other face of the honeycomb structure is likewise plugged, ensuring that the geometry of the structure is as shown in FIG. 1.

As an alternative to ceramic for the material of the honeycomb structure 12, polymer honeycombs may be fabricated via extrusion of polymer powders, injection molding or other polymer forming methods known in the art, and alternate ends may likewise be plugged. As mentioned above, Thermoplastic and thermoset polymers such as PTFE (polytetrafluoroethylene), PVDF (polyvinyledene fluoride) Polypropylene, Polyethylene, Polycarbonate, epoxy, phenolic etc., may be used to fabricate polymer honeycombs.

The metal current collectors are then coated on the internal walls of the honeycomb via any of a variety of techniques such as electroplating, ink-jet printing followed by sintering, dip coating in molten metal, slurry coating from a slurry of metal particles, thermal evaporation, CVD, sputtering, e-beam evaporation, or other suitable techniques. These techniques are generally known in the art.

Figure 5:
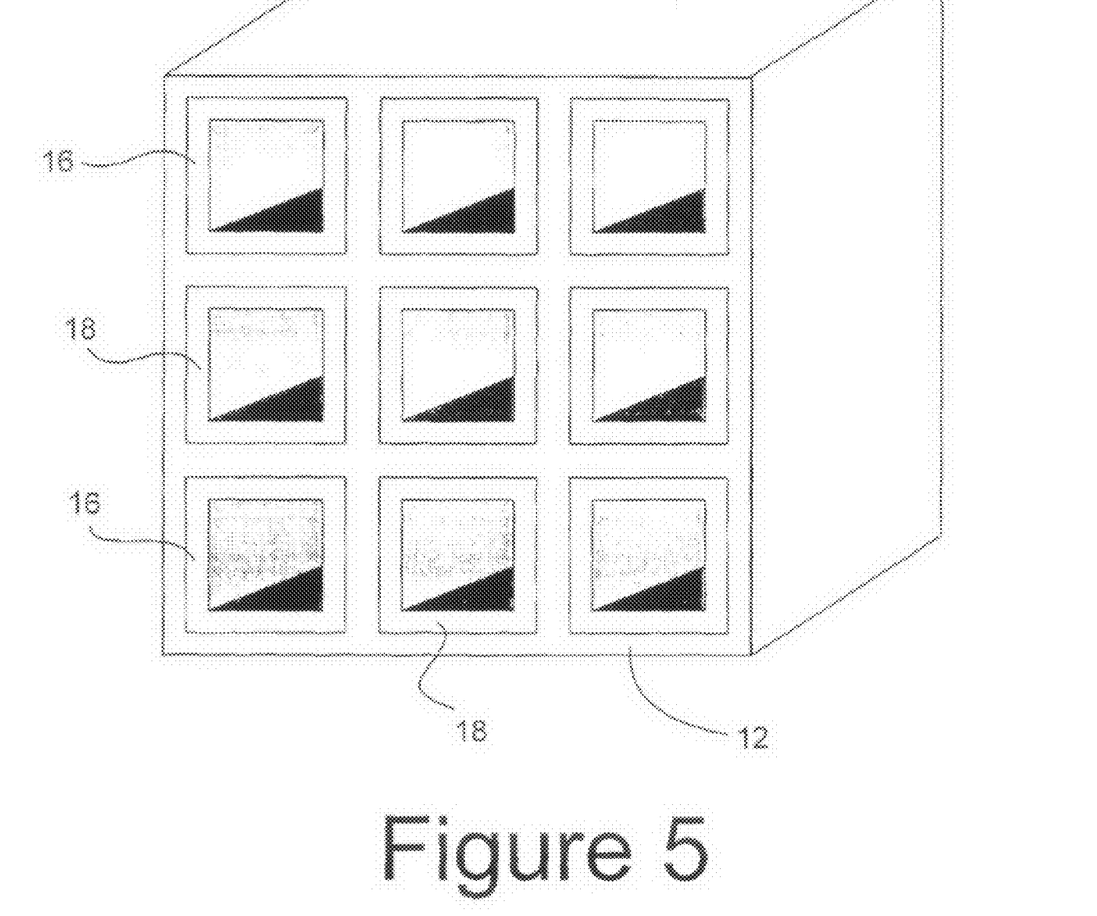
FIG. 5 is an elevational perspective showing one embodiment of current collectors useful in the context of the present invention.

FIG. 5 shows a simplified perspective view of a honeycomb structure 12 that has been coated with conductive layers 16 and 18. (The low number of cells of the honeycomb structure 12 and the substantial thickness of the conductive layers 16 and 18 are both exaggerations for ease of illustration). The conductive layers 16 and 18 extend along the common direction of the cells within the honeycomb structure and cover the entire inside surface of the cells. As a further alternative embodiment of the present invention, however, the conductive layer(s) 16 and 18 need not cover the entire inside surface of the respective cells.

Figure 6:
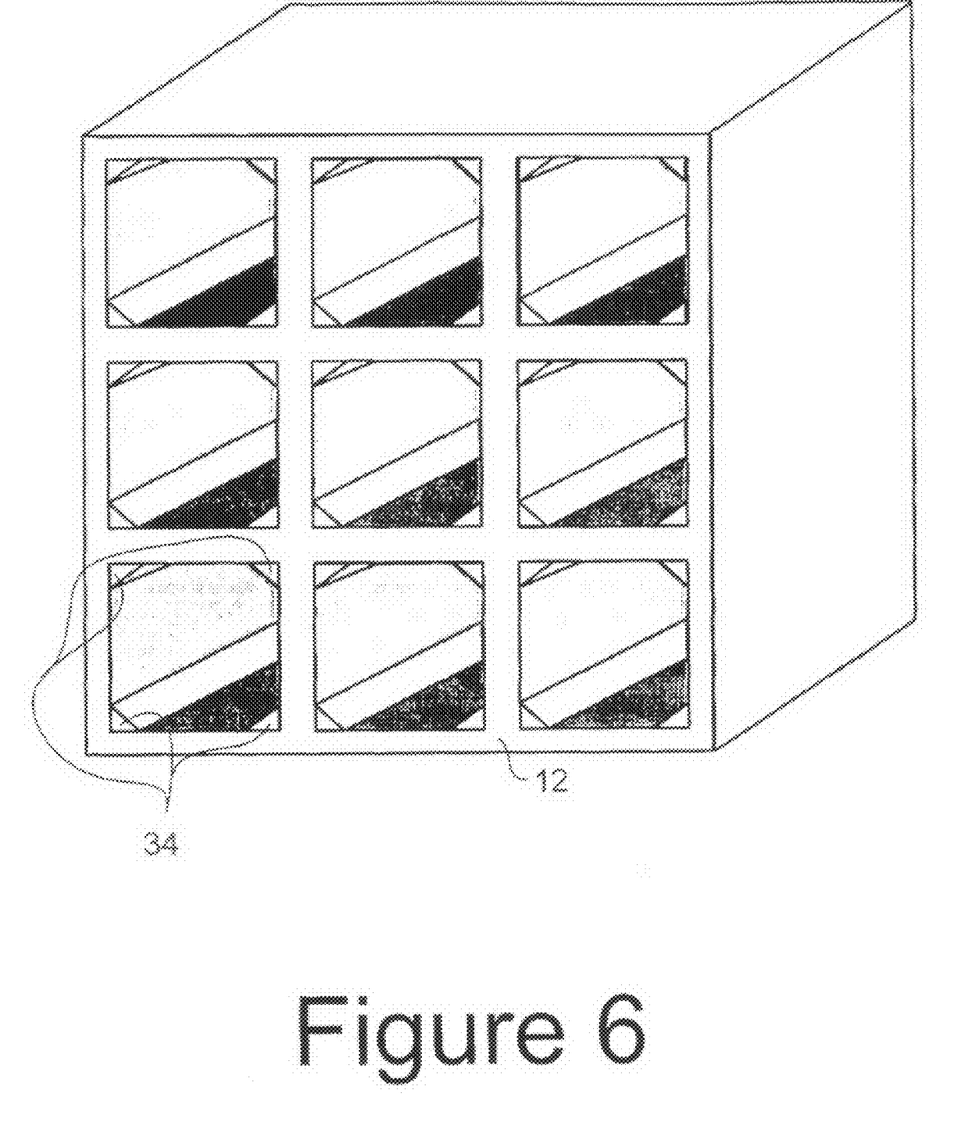
FIG. 6 is an elevational perspective showing another embodiment of current collectors useful in the context of the present invention.

FIG. 6 is a simplified perspective view of another alternative embodiment of an aspect of the present invention. FIG. 6 shows a honeycomb structure 12 that has a porous layer of conductive material 34 that extends along the common direction of the cells on a plurality of discontinuous portions of the inside surface of each cell, in this case, on the inside corner portions of the inside surface of each cell. The conductive layer 34 of FIG. 6 may be prepared by first coating the entire inner surface of the cells as in FIG. 5, then etching back the continuous coating to leave material only in the corners. Alternatively, a deposition process that preferentially deposits in the corners may be used. The current collector or conductive layer structure of the embodiment of FIG. 6, by leaving bare the walls that lie directly between adjacent cells, allows minimum separation of the electrode materials in adjacent cells while still providing good current collector presence within the cells with four separate parallel corner conductive lines extending along the common direction within each cell.

If pins or wires are to be formed for use as current collectors, the pins may be formed in parallel on a pin plate by chemical etching of metal foils, electroforming, inkjet printing, electrodischarge machining (EDM) or other metal forming or micromachining techniques known in the art.

The non-galvanic electrode material, activated carbon, for example, may be obtained from any desired precursors such as natural or synthetic precursors. The activated carbon may be standard activated high surface area carbon, or carbon produced from intercalation processes (such as for example K intercalation) which may have relatively low surface area. Carbon nanotubes may also be used as an ingredient in the electrode material, whether in conjunction with activated carbon powder or without it. Other additives to the electrode to improve connectivity and conductivity may include powders such as carbon black, graphite, carbon nanofibers, metal powders, and the like. Desirably, a mixture of the above components in a selected proportion is made. Optionally, a binder such as a polymeric binder may be added to help create an electrode paste. Although it is anticipated that carbon will be preferred at least in the near term, electrode materials useable in the context of the present invention are not limited to carbon.

One method useful to assemble a device as shown in FIG. 1 includes fabricating a plugged honeycomb of the desired geometry and composition as mentioned above. This is followed by metal coating of the walls. After metal coating, the honeycomb may be impregnated with the electrolyte. The electrode paste is then squeezed into the cells of the honeycomb. Additional electrolyte may be diffused into the device after the electrode paste is filled in. In the case where the current collectors are in a pin array shape (as in FIG. 2 described above), the arrays are inserted into the paste after the paste is filled into the structure. The top and bottom metal contacts are then put in place and the device is sealed in an appropriate container to create the finished package.

Figure 7:
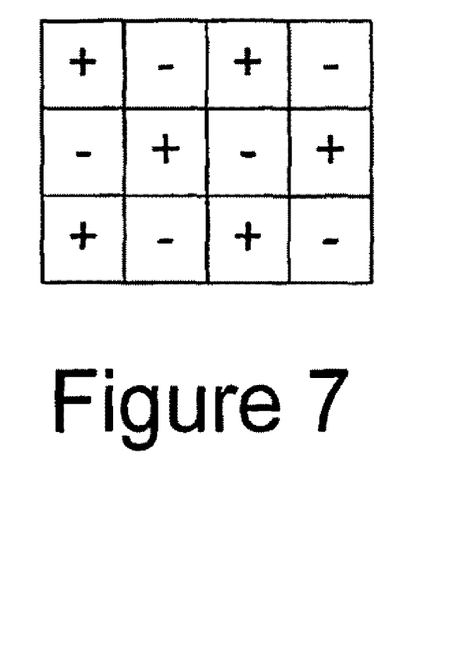
FIG. 7 is a diagrammatic cross-sectional view of one cell geometry useful in the context of the present invention.

A typical geometry for ceramic honeycomb structures comprises square shaped cells, such as represented in the diagrammatic cross section of FIG. 7. Although not required, for best energy and power density, every other cell, in both directions, should be of opposite polarity, as indicated in the FIG. 7.

The honeycomb structure of the present invention is not limited to square shaped cells, however. Any cell geometry in which even numbers of walls meet at each wall meeting point can preserve the desirable ability to make every cell boundary a polarity boundary. This is illustrated schematically in FIGS. 8-10.

Figure 8:
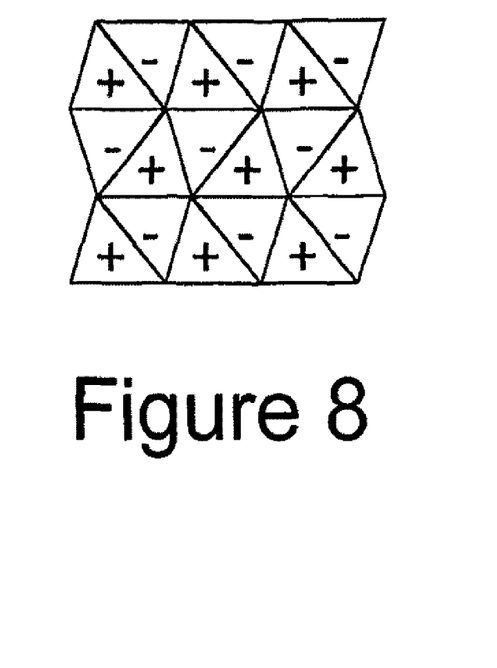
FIG. 8 is a diagrammatic cross-sectional view of an alternative cell geometry useful in the context of the present invention.

FIG. 8 shows an example of a triangular cell geometry in which six walls meet at each meeting point, and polarity can be arranged such that every wall is a polarity boundary. This alternative embodiment of the present invention may be desirable for its mechanical strength.

Figure 9:
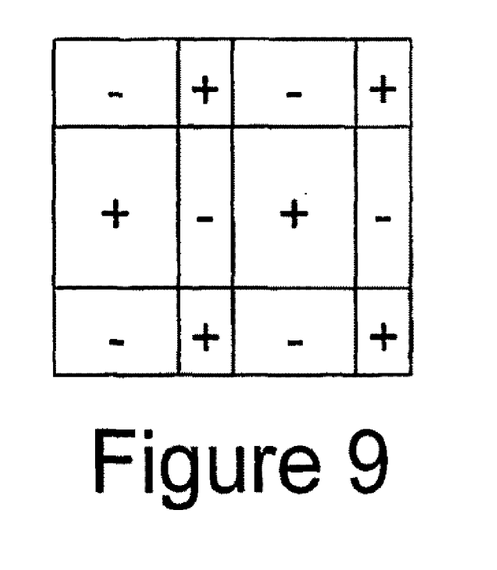
FIG. 9 is a diagrammatic cross-sectional view of another alternative cell geometry useful in the context of present invention.
Figure 10:
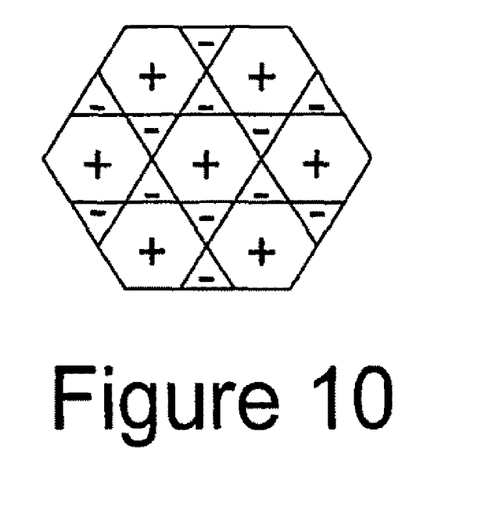
FIG. 10 is a diagrammatic cross-sectional view of still another alternative cell geometry useful in the context of the present invention.
Figure 11:
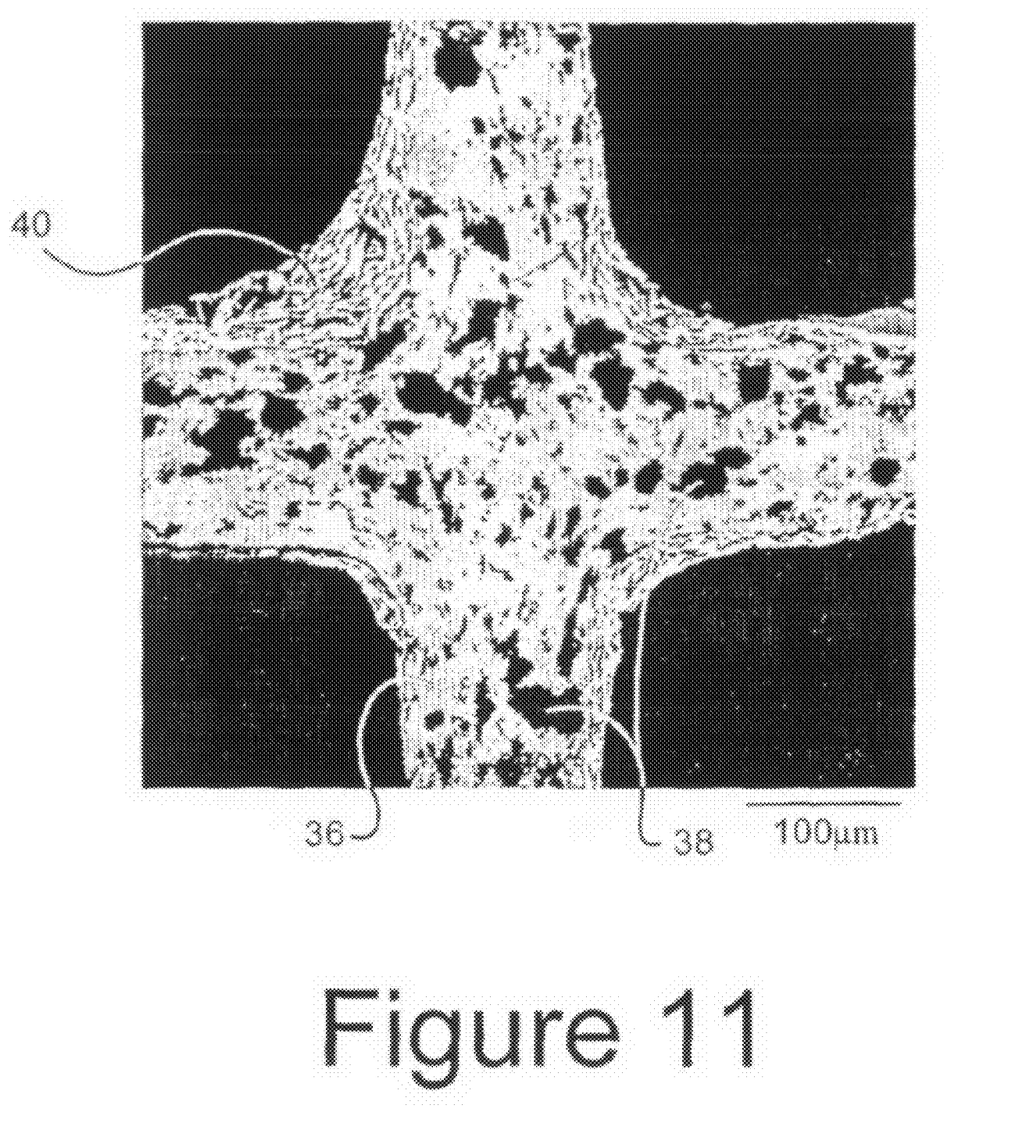
FIG. 11 is a scanning electron microscope (SEM) back-scattered electron image of a polished cross-section of a structure similar to that represented in FIG. 5 above, taken at a magnification of 250×.

FIGS. 9 and 10 show examples of geometry in which the cells are not of one standard size. In the cell geometry represented in FIG. 9, there are four different rectangles, each with a different total area. In the cell geometry represented in FIG. 10, larger-area hexagons have smaller-area triangles interspersed. These alternative embodiments of the present invention having unequal area distributions among the cells are particularly to be used in embodiments of the present invention in which one or more galvanic electrodes are employed, i.e., in hybrid capacitor embodiments. Particular hybrid capacitor chemistries are optimized only with unequal-sized electrodes. The porous honeycomb structure with unequal-sized cells provides a mechanically strong separator structure that can hold the two different types of electrodes of a hybrid capacitor device, and define and control their respective sizes so as to insure optimized performance of the hybrid capacitor device.

Example 1

Experiments were carried out to demonstrate certain capabilities of metal coating on honeycomb walls. Colliodal silver was coated on a 600 cell per square inch (186 cell per square cm) 4 mil (100 micron) wall cordierite honeycomb structure via dip coating. This particular honeycomb had 40% porosity in the walls. The honeycomb walls were thoroughly coated with an electrically continuous coating of silver. Most importantly, fracture surface of the honeycomb showed that there was no penetration of silver particles in the honeycomb pore structure, indicating that this is a feasible approach to metal coating. FIG. 10 is a scanning electron microscope (SEM) backscattered electron image of a polished cross-section of an intersection within the resulting coated honeycomb structure, taken at a magnification of 250×, and showing the honeycomb material 36, the pores within the honeycomb material 38, and the silver layer 40 deposited on the surface of the honeycomb material 36 but not in the pores 38.

Example 2

Aluminum was thermally evaporated onto a cordierite honeycomb structure with dimensions of 600 cells per square inch (186 cells per square cm), 4 mil (100 micron) wall. An excellently adherent coating of aluminum was obtained on the walls. Porosity of the coating was demonstrated via a water drop test.

Example 3

A cordierite honeycomb sample with cell dimensions of 600 cells per square inch (186 cells per square cm) and 4 mil (100 micron) wall thickness, and with a wall porosity of ~40% and pore size of 3-5 microns, was obtained. A pin array of nickel electrodes was fabricated by chemical etching of nickel sheet or foil. The resulting array was sealed to the honeycomb from one end with a silicon resin (Dow Corning Sylgard 186). The cells with the pins were then filled with a activated carbon 80% wt. PVDF 10% wt, and carbon black 10% wt paste in acetone. After the cells were filled and dried a very compact and strong structure was formed around the pins. After drying open ends of the cells were capped with the silicone resin. The procedure was repeated with the other end of the sample. The end of the pin arrays protruding from either end of the sample were connected together to form positive and negative terminals for the capacitor. Electrolyte was then introduced in the structure via impregnation. The entire assembly was then enclosed in a container and sealed, forming a working capacitor cell.

The invention claimed is:

1. An ultracapacitor or hybrid capacitor device comprising:
   an electrically non-conductive rigid or semi-rigid porous honeycomb structure having cells extending along a common direction, said cells having an average density per unit area within in a plane perpendicular to the common direction exceeding 15.5 per square centimeter;
   at least first and second electrodes contained within and extending along first and second ones of said cells, at least said first electrode being a high-surface-area non-galvanic electrode; and
   an electrolyte in mutual contact with the first and second electrodes via the pores of the porous honeycomb structure.

2. The device according to claim 1 wherein the cells have an average density per unit area within in a plane perpendicular to the common direction of at least 62 per square centimeter.

3. The device according to claim 1 wherein the cells have an average density per unit area within in a plane perpendicular to the common direction of at least 124 per square centimeter.

4. The device according to claim 1 wherein the honeycomb structure consists of a material capable of withstanding temperatures of at least 300° C.

5. The device according to claim 1 wherein the honeycomb structure comprises an oxide or non-oxide ceramic material.

6. The device according to claim 5 wherein the ceramic material is one of cordierite, silicon nitride, alumina, aluminum titanate, zircon, glass, and glass-ceramic.

7. The device according to claim 1 wherein the second electrode is a galvanic electrode.

8. The device according to claim 1 wherein the second electrode is a high-surface-area non-galvanic electrode.

9. The device according to claim 1 wherein the device comprises a plurality of first electrodes and a plurality of second electrodes.

10. The device according to claim 1 further comprising at least one current collector structure extending along said first cell in electrical contact with said first electrode.

11. The device of claim 10 comprising a plurality of first electrodes and a plurality of second electrodes.

12. The device of claim 1 further comprising at least one current collector structure extending along said first cell in electrical contact with said first electrode.

13. The device of claim 12 wherein said current collector comprises a pin structure comprised of a conductive material extending along the common direction within said first cell.

14. The device of claim 12 wherein said current collector comprises a plurality of pin structures extending along the common direction within respective ones of said cells.

15. The device of claim 12 wherein said current collector comprises a porous layer of conductive material extending at least partially along the common direction on an inside surface of said first cell.

16. The device of claim 15 wherein the porous layer of conductive material extends at least partially along the common direction on the entire inside surface of said first cell.

17. The device of claim 15 wherein the porous layer of conductive material extends at least partially along the common direction on a plurality of discontinuous portions of the entire inside surface of said first cell.

18. The device of claim 1 wherein device of claim 1 wherein the wall porosity of the honeycomb structure is at least 50%.

19. The device of claim 1 wherein the cells are square.

20. The device of claim 1 wherein the cells are of non-uniform sizes.

21. A method for forming an ultracapacitor or hybrid capacitor, the method comprising:

providing an electrically non-conductive rigid or semi-rigid porous honeycomb structure having cells extending along a common direction, said cells having an average density per unit area within in a plane perpendicular to the common direction exceeding 15.5 per square centimeter;

positioning least first and second electrodes within and extending along first and second ones of said cells, at least said first electrode being a high-surface-area non-galvanic electrode, said second electrode being either a galvanic electrode or a high-surface-area non-galvanic electrode; and contacting said first and second electrodes with an electrolyte, said electrolyte being in mutual contact with the first and second electrodes via the pores of the porous honeycomb structure.

22. The method of claim 21 wherein the step of providing an electrically non-conductive rigid or semi-rigid porous honeycomb structure includes providing a honeycomb structure capable of withstanding temperatures of at least 300° C.

23. The method of claim 21 wherein the step of providing an electrically non-conductive rigid or semi-rigid porous honeycomb structure includes providing a honeycomb structure comprising an oxide or non-oxide ceramic material.

24. The method of claim 21 wherein the step of providing an electrically non-conductive rigid or semi-rigid porous honeycomb structure includes providing a honeycomb structure comprising one of cordierite, silicon nitride, and aluminum titanate.

* * * * *